United States Patent
Altaf et al.

(10) Patent No.: US 12,447,862 B2
(45) Date of Patent: Oct. 21, 2025

(54) METHOD FOR PREDICTING AN ELECTRIC LOAD IMPARTED ON EACH BATTERY UNIT IN AN ELECTRIC ENERGY STORAGE SYSTEM

(71) Applicant: VOLVO TRUCK CORPORATION, Gothenburg (SE)

(72) Inventors: Faisal Altaf, Västra Frölunda (SE); Anton Klintberg, Torslanda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 689 days.

(21) Appl. No.: 17/757,636

(22) PCT Filed: Jun. 18, 2020

(86) PCT No.: PCT/EP2020/066919
§ 371 (c)(1),
(2) Date: Jun. 17, 2022

(87) PCT Pub. No.: WO2021/121673
PCT Pub. Date: Jun. 24, 2021

(65) Prior Publication Data
US 2023/0041052 A1    Feb. 9, 2023

(51) Int. Cl.
*B60L 58/21*    (2019.01)
*B60L 3/00*    (2019.01)
(Continued)

(52) U.S. Cl.
CPC ............ *B60L 58/21* (2019.02); *B60L 3/0046* (2013.01); *B60L 58/10* (2019.02); *B60L 58/12* (2019.02);
(Continued)

(58) Field of Classification Search
CPC .......... B60L 3/0046; B60L 3/12; B60L 58/10; B60L 58/12; B60L 58/14; B60L 58/15;
(Continued)

(56) References Cited

U.S. PATENT DOCUMENTS

2014/0372053 A1    12/2014 Lin et al.
2018/0134160 A1*   5/2018 Kratzer .................. B60L 58/14

FOREIGN PATENT DOCUMENTS

EP         3011655 B1     5/2017
JP      2018096803 A  *   6/2018

OTHER PUBLICATIONS

English translation JP2018-096803,A (Year: 2018).*
(Continued)

*Primary Examiner* — Eman A Alkafawi
*Assistant Examiner* — Courtney G McDonnough
(74) *Attorney, Agent, or Firm* — Venable LLP; Jeffri A. Kaminski

(57) ABSTRACT

A method for predicting an electric load imparted on each battery unit in an electric energy storage system comprising at least two battery units electrically connected in parallel to each other. The method comprises establishing a battery parameter set, the battery parameter set comprising at least the following values for each battery unit in the electric energy storage system: an internal ohmic resistance value indicative of the internal ohmic resistance of the battery unit and an open circuit voltage value indicative of the open circuit voltage of the battery unit, using an electric load level indicative of a total electric energy storage system load, and using the electric load level and the battery parameter set for predicting the imparted load on each battery unit in the electric energy storage system.

19 Claims, 6 Drawing Sheets

(51) Int. Cl.
    *B60L 58/10*     (2019.01)
    *B60L 58/12*     (2019.01)
    *B60L 58/15*     (2019.01)
    *B60L 58/16*     (2019.01)
    *B60L 58/22*     (2019.01)
    *G01R 31/367*     (2019.01)
    *G01R 31/382*     (2019.01)
    *G01R 31/3835*     (2019.01)
    *G01R 31/389*     (2019.01)
    *H01M 10/42*     (2006.01)
    *H01M 10/48*     (2006.01)
    *H02J 7/00*     (2006.01)

(52) U.S. Cl.
    CPC ............... *B60L 58/15* (2019.02); *B60L 58/16* (2019.02); *B60L 58/22* (2019.02); *G01R 31/367* (2019.01); *G01R 31/382* (2019.01); *G01R 31/3835* (2019.01); *G01R 31/389* (2019.01); *H01M 10/425* (2013.01); *H01M 10/482* (2013.01); *H02J 7/0048* (2020.01); *H02J 7/0063* (2013.01); *B60L 2240/545* (2013.01); *B60L 2240/547* (2013.01); *B60L 2240/549* (2013.01); *B60L 2260/44* (2013.01); *H01M 2010/4271* (2013.01); *H01M 2220/20* (2013.01)

(58) Field of Classification Search
    CPC .......... B60L 58/16; B60L 58/21; B60L 58/22; B60L 2240/545; B60L 2240/547; B60L 2240/549; B60L 2260/44; G01R 31/367; G01R 31/382; G01R 31/3835; G01R 31/389; H01M 10/425; H01M 10/482; H01M 2010/4271; H01M 2220/20; H02J 7/0048; H02J 7/0063; Y02E 60/10
    See application file for complete search history.

(56) References Cited

OTHER PUBLICATIONS

International Search Report and Written Opinion in corresponding International Application No. PCT/EP2020/066919 mailed Nov. 6, 2020 (17 pages).

International Preliminary Report on Patentability in corresponding International Application No. PCT/EP2020/066919 mailed Mar. 7, 2022 (8 pages).

\* cited by examiner

METHOD FOR PREDICTING AN ELECTRIC LOAD IMPARTED ON EACH BATTERY UNIT IN AN ELECTRIC ENERGY STORAGE SYSTEM

CROSS-REFERENCE TO RELATED APPLICATIONS

This application is a U.S. National Stage application of PCT/EP2020/066919, filed Jun. 18, 2020 and published on Jun. 24, 2021, as WO 2021/121673, which claims the benefit of International Patent Application Nos. PCT/EP2019/086833 filed on Dec. 20, 2019, and PCT/EP2019/086835 filed on Dec. 20, 2019, all of which are hereby incorporated by reference in their entireties.

TECHNICAL FIELD

The present disclosure relates to a method for predicting an electric load imparted on each battery unit in an electric energy storage system. Additionally, the present disclosure relates to a method for evaluating the impact that an electric load level will have on an electric energy storage system. Moreover, the present disclosure relates to a method for determining an electric load to be imparted on an electric energy storage system. Furthermore, the present disclosure relates to a method for controlling the loading of an electric energy storage system. The present disclosure also relates to a computer program as well as to a computer readable medium. Further, the present disclosure relates to a battery management system for an electric energy storage system.

BACKGROUND

Energy storage systems are frequently used in a wide variety of applications and fields of technology. In the automotive industry, energy storage systems may be used for propulsion of a vehicle as well as for providing electrical energy to various systems of a vehicle. As another non-limiting example, energy storage systems may be used in stationary energy storage applications, for instance in so called smart grid and power back-up applications.

In order to increase the power capability of the energy storage system, a solution can be provided where two or more battery modules/battery packs of the energy storage system are connected in parallel to each other. Hereby, the individual battery modules can be easily connected to, or disconnected from, each other. Also, an increased total power capability is provided in comparison to using only a single battery module/battery pack.

However, a problem with energy storage systems having battery modules connected in parallel is that the battery modules need to be in approximately the same physical state for optimal energy usage. It is however a common scenario that the battery modules/battery packs are not in the same physical state. For example, if the parallel connected battery modules are differently aged, i.e. one of the battery modules has been recently replaced by a new and unused battery module, there will most likely be a difference in power capability between the differently aged battery modules. For instance, the older and weaker battery module may have a complicated dynamic interaction with the new and more powerful battery module and may thus pull down the total available power of this joint system as compared to their individual sum. In short, the maximum available power of the energy storage system will be limited by the weakest link in the system, i.e. the oldest battery module.

Also, care should be taken when mixing battery modules/packs of different generation/types of in an energy storage system, since their characteristics, such as internal resistance, open-circuit-voltage (OCV), capacity, etcetera, may be significantly different from each other. Another example is that if one of the battery modules has a higher temperature than the other battery modules of the same energy storage system, the resistance of the battery module having elevated temperature will most likely be lower than the resistance of the battery modules having lower temperature. In such a situation, there is a risk that the warmer battery module will receive a charge current exceeding its threshold.

Another problem with energy storage systems having parallel connected battery modules is that different battery packs may be placed in different locations of the vehicle, and may thus require high-voltage cables of different lengths, thereby introducing large differences in resistances.

A typical approach to solve the above-mentioned problem is disclosed in EP 3 011 655, and is based on utilization of the battery units based on constraints dictated by a weakest link in the network, i.e. by the battery pack having the lowest state-of-power. The method of EP 3 011 655 uses a substantially conservative approach where the lowest maximum power capability of one of the battery packs is multiplied by the total number of battery packs in order to get the total power capability of the ESS. By using this worst case scenario some of the battery packs may not be fully used i.e. may not deliver/receive power according to their maximum discharge/charge power ability.

There is hence a need for improved controlling of charge and discharge capability for energy storage systems having battery units connected in parallel.

SUMMARY

In view of the above, an object of a first aspect of the present disclosure is to provide a method implying an appropriate use of an electric energy storage system.

As such, a first aspect of the present disclosure relates to a method for predicting an electric load imparted on each battery unit in an electric energy storage system comprising at least two battery units electrically connected in parallel to each other. The method comprises:
  establishing a battery parameter set, the battery parameter set comprising at least the following values for each battery unit in the electric energy storage system: an internal ohmic resistance value indicative of the internal ohmic resistance of the battery unit and an open circuit voltage value indicative of the open circuit voltage of the battery unit,
  using an electric load level indicative of a total electric energy storage system load and
  using the electric load level and the battery parameter set for predicting the imparted load on each battery unit in the electric energy storage system.

Thus, by virtue of the above method, it is possible to predict the influence that a total electric energy storage system load may have on each battery unit in an electric energy storage system. Moreover, since the above method takes at least each battery unit's internal ohmic resistance and open circuit voltage into account, such influence may be determined with an appropriate level of accuracy.

Information indicative of the imparted load on each battery unit in the electric energy storage system may be used for a plurality of purposes as will be elaborated on hereinbelow.

Optionally, the method according to the first aspect of the present disclosure comprises predicting the imparted load on each battery unit in the electric energy storage system by employing a multi-battery model that takes into account the electric interaction, preferably the electrical dynamic interaction, between the battery units of the electric energy storage system.

Taking the electric interaction into account may further enhance the accuracy when predicting the loads imparted on the battery units.

Optionally, the imparted load comprises two addends: a first addend indicative of differences in the internal ohmic resistance values amongst the battery units of the electric energy storage system and a second addend indicative of differences in the open circuit voltage values amongst the battery units of the electric energy storage system.

Optionally, the first addend for a certain battery unit of the electric energy storage system comprises a first addend factor multiplied by the electric load level, the first addend factor comprising a numerator and a denominator in accordance with the following:

for the certain battery unit, the numerator comprising the product of the internal ohmic resistance values of every battery unit in the electric energy storage system except for the certain battery unit, and the denominator comprises the sum of a set of products, the number of the products corresponding to the number of battery units in the electric energy storage system and each product being assigned to an individual battery unit of the electric energy storage system, wherein a product for a certain battery unit is obtained by multiplying internal ohmic resistance values of all battery units in the electric energy storage system except for the individual battery unit.

Optionally, the second addend for a certain battery unit is proportional to the sum of a set of summands, the number of the summands corresponding to the number of battery units minus one, and each summand is associated to a specific battery unit being different from the certain battery unit and the summand being calculated in accordance with the following:

for each battery unit in the electric energy storage system which is not the certain battery unit: calculating the difference in the open circuit voltage values between the battery unit and the certain battery unit and multiplying that difference by the product of the internal ohmic resistance value of each one of the battery units in the electric energy storage system, except for the certain battery unit and the specific battery unit and adding that value to the summand.

Optionally, each one of the summand is divided by a denominator, the denominator comprising the sum of a set of products, the number of the products corresponding to the number of battery units in the electric energy storage system and each product being assigned to an individual battery unit of the electric energy storage system, wherein a product for a certain battery unit is obtained by multiplying internal ohmic resistance values of all battery units in the electric energy storage system except for the individual battery unit.

Optionally, the battery parameter set further comprises one, more or all of the following values for each battery unit in the electric energy storage system: a state-of-charge value indicative of the state-of-charge of the battery unit, a state-of-health value indicative of the state-of-health of the battery unit and an internal impedance value indicative of the internal impedance of the battery unit.

Optionally, the electric energy storage system has a set of connective resistances comprising a connective resistance between each adjacent pair of battery units in the electric energy storage system and/or a connective resistance between each battery unit and a reference point in the electric energy storage system. The method further comprises also using the set of connective resistances for determining an imparted load on each battery unit in the electric energy storage system.

A second aspect of the present disclosure relates to a method for evaluating the impact that an electric load level will have on an electric energy storage system comprising at least two battery units electrically connected in parallel to each other. The method comprises:

for each battery unit in the electric energy storage system, determining a state-of-power value, the state-of-power value being indicative of the maximum amount of electric load that the battery unit can deliver or receive at a constant load level during a predetermined future time range without violating electro-thermal limits of the battery unit, on the basis of the electric load level, predicting the electric load imparted on each battery unit in an electric energy storage system according to the method of the first aspect of the present disclosure, and for each battery unit in the electric energy storage system, determining whether or not the battery load exceeds the state-of-power value.

The method of the second aspect of the present disclosure may be used for a plurality of purposes. As a non-limiting example, the method of the second aspect of the present disclosure may be used for checking whether or not an intended electric load level is appropriate for an electric energy storage system.

A third aspect of the present disclosure relates to a method for determining an electric load to be imparted on an electric energy storage system comprising at least two battery units electrically connected in parallel to each other. The method comprises employing a correction process comprising the following correction steps:

evaluating the impact that an electric load level will have on the electric energy storage system using the method according to the second aspect of the present disclosure, in response to the determination that the battery load exceeds the state-of-power value for at least one of the battery units, reducing the electric load level, and in response to the determination that the battery load is lower than the state-of-power value for each one of the battery units, increasing the electric load level, the method further comprises setting the electric load level being the result from the correction process as the electric load.

The method of the third aspect of the present disclosure implies that a suitable load level, preferably a load level with a maximum load amount, may be determined for the electric energy storage system without necessarily jeopardizing the health as well as the safety of any one of the battery units.

Optionally, the correction process is an iterative process that repeats the correction steps above until a stopping criterion has been reached.

Optionally, the stopping criterion comprises that a smallest battery offset value, being the difference between the battery load and the state-of-power value for a battery unit, among the battery units, is within a predetermined threshold range, preferably the predetermined threshold range is zero.

A fourth aspect of the present disclosure relates to a method for determining an electric load to be imparted on an electric energy storage system comprising at least two battery units electrically connected in parallel to each other, the method employing the method for evaluating the impact that an electric load level will have on an electric energy storage system according to the second aspect of the present disclosure and comprising determining the largest electric load that can be imparted on an electric energy storage system without the battery load exceeding the state-of-power value for any battery unit in the electric energy storage system.

A fifth aspect of the present disclosure relates to a method for determining an electric load to be imparted on an electric energy storage system comprising at least two battery units electrically connected in parallel to each other. The method comprises:

establishing a battery parameter set, the battery parameter set comprising at least the following values for each battery unit in the electric energy storage system: an internal ohmic resistance value indicative of the internal ohmic resistance of the battery unit and an open circuit voltage value indicative of the open circuit voltage of the battery unit, for each battery unit in the electric energy storage system, determining a state-of-power value, the state-of-power value being indicative of the maximum amount of electric load that the battery unit can deliver or receive at a constant load level during a predetermined future time range without violating electro-thermal limits of said battery unit, for each battery unit in the electric energy storage system, determining a battery unit measure being proportional to the magnitude of a sum of elements, a first element being the product of the internal ohmic resistance value and the state-of-power value and a second element being the open circuit voltage value, among the battery units in the electric energy storage system, determining the smallest magnitude of the battery unit measure in order to arrive at an electric load measure indicative of the electric load to be imparted on an electric energy storage system.

As compared to the third and fourth, respectively, aspect of the present disclosure, the method according to the fifth aspect of the present disclosure need not necessarily explicitly predict an imparted load on each battery unit in the electric energy storage system in order to determine an electric load to be imparted on an electric energy storage system.

Optionally, the method according to the fifth aspect of the present disclosure further comprises multiplying the smallest unit magnitude measure by the sum of the inverse of the internal ohmic resistance value for each battery unit in the electric energy storage system.

Optionally, the method according to the fifth aspect of the present disclosure further comprises subtracting the ratio between the open circuit voltage and the internal ohmic resistance for each battery unit in the electric energy storage system from the electric load measure Optionally, the battery unit state-of-power value is a battery unit state of charging power value, the method comprising: among the battery units in the electric energy storage system, determining the smallest battery unit measure in order to arrive at an electric load measure indicative of the electric load to be imparted on an electric energy storage system.

Optionally, the battery unit state-of-power value is a battery unit state of discharging power value, the method comprising: among the battery units in the electric energy storage system, determining the largest battery unit measure in order to arrive at an electric load measure indicative of the electric load to be imparted on an electric energy storage system.

Optionally, the method comprises:
for each one of a plurality of time instants, determining an electric load to be imparted on an electric energy storage system using the method according to any one of the third to fifth aspects of the present disclosure, and
determining the electric load by applying a filter, preferably a low pass filter and/or a weighted moving average filter, to the electric loads for the plurality of time instants.

The above filtering implies that e.g. large fluctuations in the determined electric load due to e.g. noisy current and voltage measurements may be reduced.

A sixth aspect of the present disclosure relates to a method for controlling the loading of an electric energy storage system comprising at least two battery units electrically connected in parallel to each other, the method comprising determining the electric load to be imparted on an electric energy storage system using the method according to any one of the third to fifth aspects of the present disclosure, and imparting the thus determined electric load on the energy storage system.

Optionally, the state-of-power value is indicative of the maximum amount of electric current, alternatively electric power, that the battery unit can deliver or receive at a constant load level during the predetermined future time range without violating electro-thermal limits of said battery unit.

Optionally, the electric load is indicative of electric current, alternatively electric power.

A seventh aspect of the present disclosure relates to a computer program comprising program code means for performing the steps of any one of first to sixth aspects of the present disclosure when the program is run on a computer.

An eighth aspect of the present disclosure relates to a computer readable medium carrying a computer program comprising program means for performing the steps of any one of first to sixth aspects of the present disclosure when the program means is run on a computer.

An ninth aspect of the present disclosure relates to a battery management system for an electric energy storage system comprising at least two battery units electrically connected in parallel to each other, the battery management system being adapted to predict an electric load imparted on each battery unit in the electric energy storage system by:

establishing a battery parameter set, the battery parameter set comprising at least the following values for each battery unit in the electric energy storage system: an internal ohmic resistance value indicative of the internal ohmic resistance of the battery unit and an open circuit voltage value indicative of the open circuit voltage of the battery unit, using an electric load level indicative of a total electric energy storage system load, and using the electric load level and the battery parameter set for predicting the imparted load on each battery unit in the electric energy storage system.

Purely by way of example, the battery management system may be configured for predicting an electric load imparted on each battery unit in an electric energy storage system according to the first aspect of the present disclosure and/or for evaluating the impact that an electric load level will have on an electric energy storage system according to the second aspect of the present disclosure and/or for determining an electric load to be imparted on an electric energy storage system according to any one of the third to fifth aspects of the present disclosure and/or for controlling the loading of an electric energy storage system according to the sixth aspect of the present disclosure.

BRIEF DESCRIPTION OF THE DRAWINGS

The above, as well as additional objects, features and advantages of the present disclosure, will be better understood through the following illustrative and non-limiting detailed description of exemplary embodiments of the present disclosure, wherein.

Figure 1:
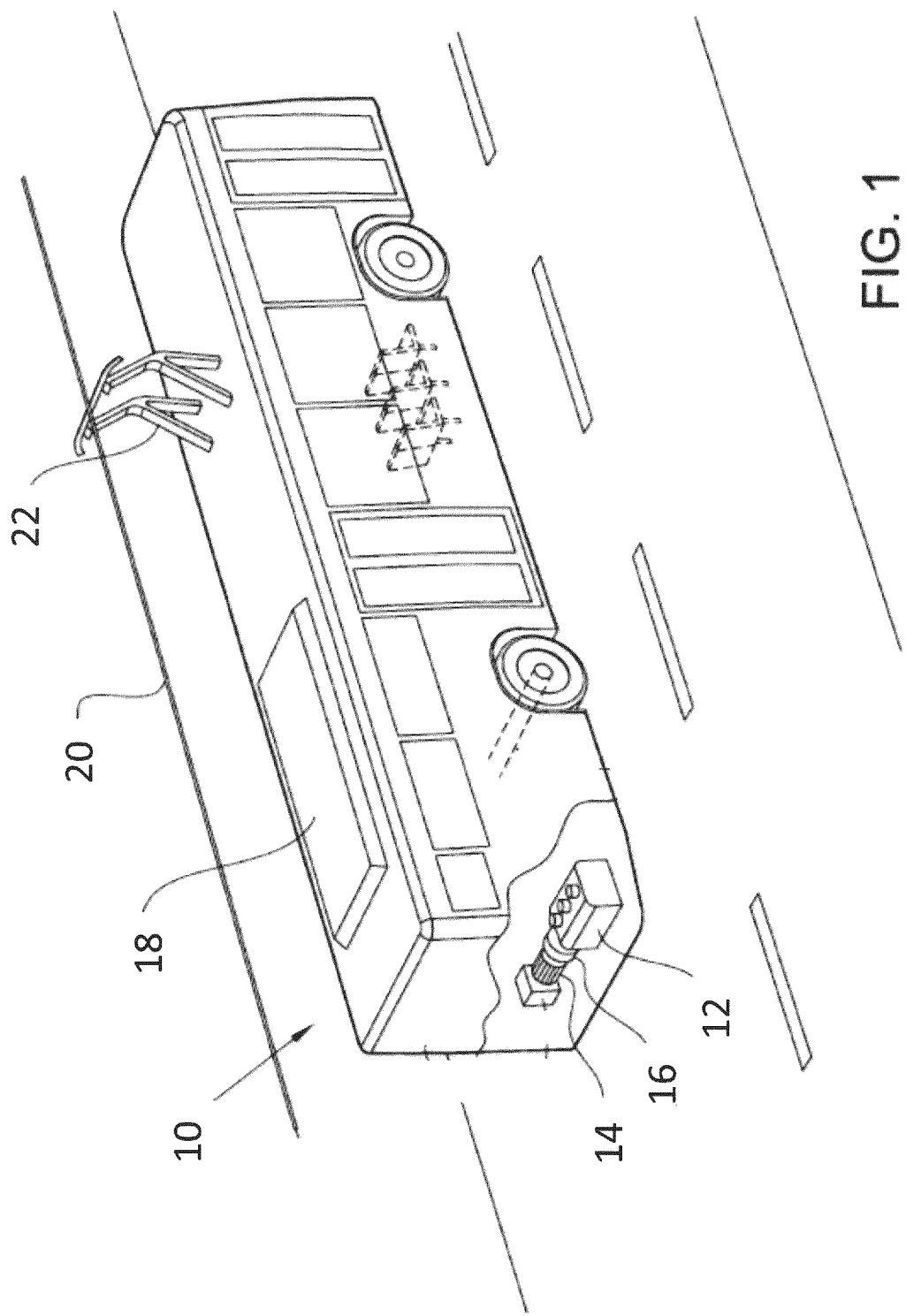
FIG. 1 schematically illustrates a hybrid vehicle in the form of a bus, in which the present disclosure can be used, FIG. 2 schematically illustrates an embodiment of an electric energy storage system, and FIG. 3 schematically illustrates a single battery model, FIG. 4 schematically illustrates a multi-battery model.

With reference to the appended drawings, below follows a more detailed description of embodiments of the disclosure cited as examples.

DETAILED DESCRIPTION OF PREFERRED EMBODIMENTS

The present disclosure will now be described more fully hereinafter with reference to the accompanying drawings, in which exemplary embodiments of the present disclosure are shown. The disclosure may, however, be embodied in many different forms and should not be construed as limited to the embodiments set forth herein; rather, these embodiments are provided for thoroughness and completeness. The skilled person will recognize that many changes and modifications may be made within the scope of the appended claims.

Similar reference characters refer to similar elements throughout the description.

FIG. 1 illustrates a simplified perspective view of a vehicle in the form of a bus 10 according to an embodiment of the present disclosure. In fact, the FIG. 1 embodiment of the vehicle 10 is of the plug-in hybrid type which is equipped with an internal combustion engine 12 and an electric machine 14 which are connected to each other via a clutch 16 and wherein both the internal combustion engine 12 and the electrical machine 14 can be used to drive the bus 10. It is also contemplated that the vehicle 10 may be an electrical vehicle not comprising an internal combustion engine for the propulsion of the vehicle. Even though the present disclosure is described with reference to a vehicle in the form of a bus, it can be used for virtually any type of system for storing electric energy. FIG. 1 further illustrates that the vehicle 1 comprises an electric energy storage system 18 which for instance may be adapted to power the electrical machine 14 and/or other electrical components (not shown) of the vehicle 10.

Purely by way of example, and as indicated in FIG. 1, the electric energy storage system 18 may be charged via an overhead wire 20 and a pantograph 22. However, it is also contemplated that the electric energy storage system 18 may be charged using other means (not shown in FIG. 1).

As may be realized from the above, the electric energy storage system 18 may be charged with electric power and/or electric power may be discharged from the electric energy storage system 18.

Figure 2:
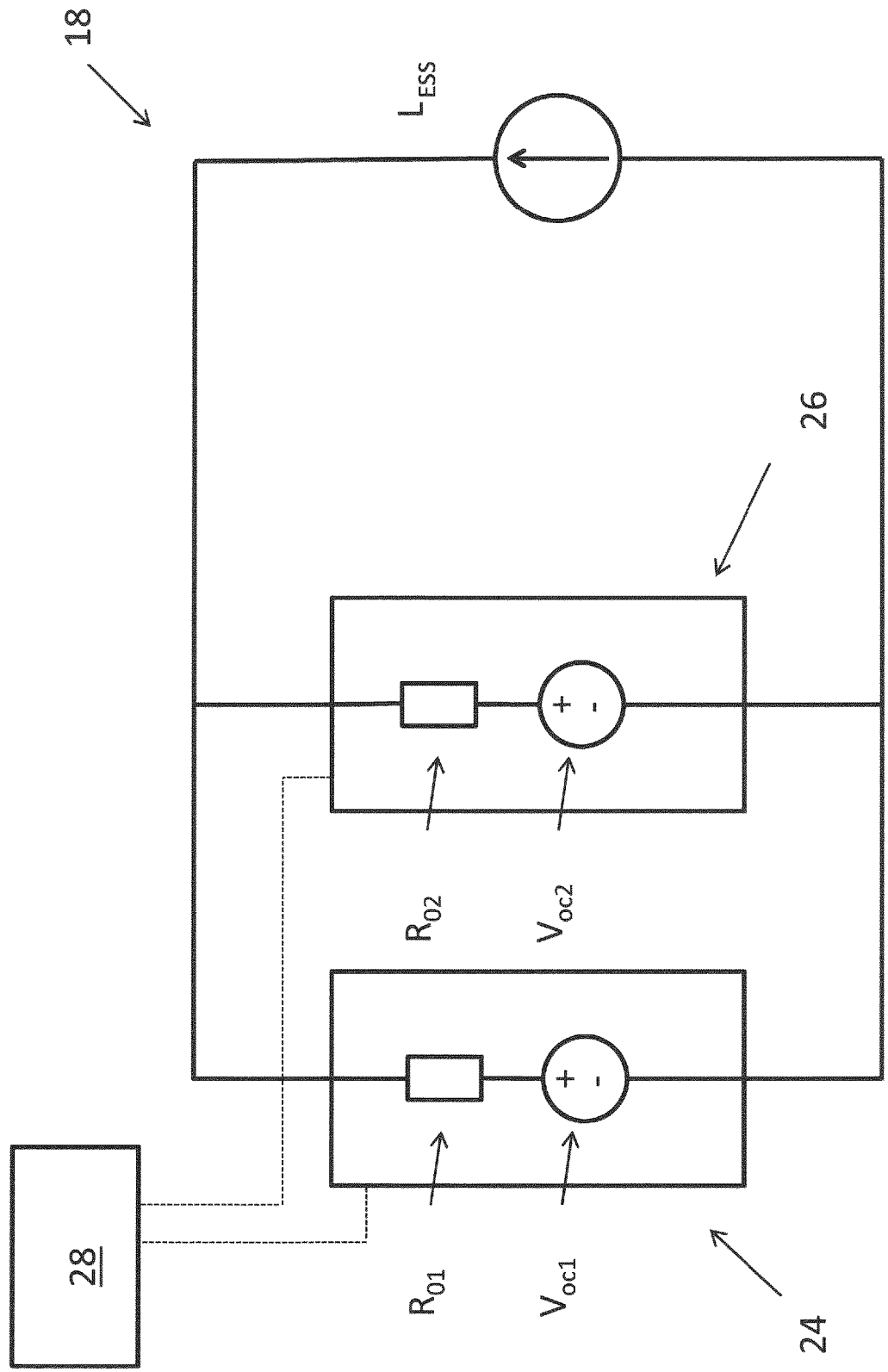

FIG. 2 schematically illustrates an embodiment of the electric energy storage system 18. Purely by way of example, the FIG. 2 electric energy storage system 18 may be used for powering a vehicle, such as the FIG. 1 vehicle 10. However, embodiments of the electric energy storage system 18 according to the present disclosure may be used for any application delivering and/or requiring electric power. Purely by way of example, embodiments of the electric energy storage system 18 may be used in a stationary energy storage application (not shown) as well like in smart grid, back-up power, charger support or the like.

As may be gleaned from FIG. 2, the electric energy storage system 18 comprises at least two battery units 24, 26 electrically connected in parallel to each other. Although the FIG. 2 embodiment of the electric energy storage system 18 contains only two battery units, it is envisage that other embodiments may comprise more than two battery units (not shown).

Moreover, as indicated in FIG. 2, a set of battery unit specific battery values is associated with each one of the battery units 24, 26. Such battery unit specific battery values include at least an internal ohmic resistance value $R_{O1}$, $R_{O2}$ indicative of the internal ohmic resistance of the battery unit 24, 26 and an open circuit voltage value $V_{oc1}$, $V_{oc2}$ indicative of the open circuit voltage of the battery unit 24, 26. Hereinafter, an internal ohmic resistance value for a battery unit i is denoted $R_{Oi}$ whereas an open circuit voltage value for a battery unit i is denoted $V_{oci}$.

The battery units according to the present disclosure may be same or different, and may for instance be of lithium-ion or sodium-ion type. A sodium-ion battery typically includes any type of sodium iron battery or sodium ferrite battery.

FIG. 2 further illustrates that the electric energy storage system 18 may further comprise a battery management system 28. Purely by way of example, and as exemplified in FIG. 2, the battery management system 28 may be adapted to receive information from the electric energy storage system 18. Purely by way of example, the battery management system 28 may be adapted to receive information indicative of the one or more parameters indicating the status of each battery unit 24, 26, for instance at a certain time instant.

Instead of, or in addition to, the above-mentioned battery management system 28, embodiments of the electric energy storage system 18 may comprise individual battery management units (not shown in FIG. 2) for each battery unit 24, 26. Purely by way of example, such an individual battery management unit may receive and process one or more parameters indicating the status of each battery unit 24, 26 and forward information to an electric energy storage system corresponding to e.g. an electric energy storage system control unit (not shown).

Irrespective of the configuration of the battery management system 28, the system may be adapted to carry out one or more embodiments of the methods according to any one of the aspects according to the present disclosure. Example embodiments are presented hereinbelow. In order to keep the description brief, the below description generally uses a method as an example for presenting various features of the present disclosure. However, it should be noted that the description of the method should be equally applicable to the battery management system 28 and vice versa.

As such, a first aspect of the present disclosure relates to a method for predicting an electric load $L_i$ imparted on each battery unit i in an electric energy storage system 18 comprising at least two battery units 24, 26 electrically connected in parallel to each other. The method comprises:

establishing a battery parameter set, the battery parameter set comprising at least the following values for each battery unit in the electric energy storage system: an internal ohmic resistance value $R_{0i}$ indicative of the internal ohmic resistance of the battery unit and an open circuit voltage value $V_{oci}$ indicative of the open circuit voltage of the battery unit, using an electric load level $L_{ESS}$ indicative of a total electric energy storage system load, and using the electric load level $L_{ESS}$ and the battery parameter set for predicting the imparted load $L_i$ on each battery unit in the electric energy storage system.

Purely by way of example, the imparted load may comprise two addends $A_{i1}$, $A_{i2}$, viz a first $A_{i1}$ and a second addend $A_{i2}$. The first addend $A_{i1}$ may be indicative of differences in the internal ohmic resistance values amongst the battery units of the electric energy storage system. The differences in the internal ohmic resistance values may also be referred to as a resistance imbalance between the battery units 24, 26 of the electric energy storage system 18. Moreover, the second addend $A_{i2}$ may be indicative of differences in the open circuit voltage values amongst the battery units of the electric energy storage system.

As a non-limiting example, the first addend $A_{i1}$ for a certain battery unit of the electric energy storage system may comprise a first addend factor multiplied by the electric load level $L_{ESS}$. The first addend factor comprises a numerator and a denominator $\theta$ in accordance with the following:

for the certain battery unit, the numerator comprising the product of the internal ohmic resistance values of every battery unit in the electric energy storage system except for the certain battery unit, and the denominator $\theta$ comprises the sum of a set of products, the number of the products corresponding to the number of battery units in the electric energy storage system and each product being assigned to an individual battery unit of the electric energy storage system, wherein a product for a certain battery unit is obtained by multiplying internal ohmic resistance values of all battery units in the electric energy storage system except for the individual battery unit.

For a set of n battery units 1, . . . , n in a electric energy storage system 18, the first addend $A_{i1}$ for a battery unit i in the set may be formulated in accordance with the following:

$$A_{i1} = \frac{1}{\theta} \cdot \prod_{k \neq i}^{n} R_{0k} \cdot L_{ESS} \qquad \text{Eq. 1}$$

$$\theta = \sum_{i=1}^{n} \left( \prod_{k \neq i}^{n} R_{0k} \right) \qquad \text{Eq. 2}$$

For a set of n battery units only containing three battery units, using Eq. 1 and Eq. 2, the first addend $A_{11}$ for the first battery unit 1 in the set may be formulated in accordance with the following:

$$A_{11} = \frac{R_{02} \cdot R_{03}}{\theta} \cdot L_{ESS} \qquad \text{Eq. 3}$$

$$\theta = R_{01} \cdot R_{02} + R_{01} \cdot R_{03} + R_{02} \cdot R_{02} \qquad \text{Eq. 4}$$

Moreover, the second addend $A_{i2}$ for a certain battery unit is proportional to the sum of a set of summands. The number of the summands corresponds to the number of battery units minus one, and each summand is associated to a specific battery unit being different from the certain battery unit and the summand being calculated in accordance with the following:

for each battery unit in the electric energy storage system which is not the certain battery unit: calculating the difference in the open circuit voltage values between the battery unit and the certain battery unit and multiplying that difference by the product of the internal ohmic resistance value of each one of the battery units in the electric energy storage system, except for the certain battery unit and the specific battery unit and adding that value to the summand.

The above approach is presented hereinbelow wherein index i indicates the certain battery unit and index k indicates the specific battery unit.

$$A_{i2} \sim \sum_{k \neq i}^{n} \left( (V_{ock} - V_{oci}) \cdot \prod_{\substack{j \neq k \\ j \neq i}}^{n} R_{0j} \right) \qquad \text{Eq. 5}$$

Moreover, each one of the summand may be divided by a denominator $\theta$, which denominator has been presented hereinabove. As such, the second addend $A_{i2}$ may be formulated in accordance with the following:

$$A_{i2} = \frac{1}{\theta} \sum_{k \neq i}^{n} \left( (V_{ock} - V_{oci}) \cdot \prod_{\substack{j \neq k \\ j \neq i}}^{n} R_{0j} \right) \qquad \text{Eq. 6}$$

$$\theta = \sum_{i=1}^{n} \left( \prod_{k \neq i}^{n} R_{0k} \right) \qquad \text{Eq. 7}$$

For a set of n battery units only containing three battery units, using Eq. 6 and Eq. 7, the second addend $A_{12}$ for the first battery unit 1 in the set may be formulated in accordance with the following:

$$A_{12} = \frac{R_{03}}{\theta} \cdot (V_{oc2} - V_{oc1}) + \frac{R_{02}}{\theta} \cdot (V_{oc3} - V_{oc1}) \qquad \text{Eq. 8}$$

$$\theta = R_{01} \cdot R_{02} + R_{01} \cdot R_{03} + R_{02} \cdot R_{02} \qquad \text{Eq. 9}$$

Combining Eq. 1, Eq. 6 and Eq. 7 results in the following expression for the load $L_i$ of a battery unit i:

$$L_i = \frac{1}{\theta} \cdot \prod_{k \neq i}^{n} R_{0k} \cdot L_{ESS} + \frac{1}{\theta} \sum_{k \neq i}^{n} \left( (V_{ock} - V_{oci}) \cdot \prod_{\substack{j \neq k \\ j \neq i}}^{n} R_{0j} \right) \qquad \text{Eq. 10}$$

$$\theta = \sum_{i=1}^{n} \left( \prod_{k \neq i}^{n} R_{0k} \right) \qquad \text{Eq. 11}$$

In the above examples, the loads $L_i$, $L_{ESS}$ have been expressed as electric currents $I_i$, $I_{ESS}$. However, it is also envisaged that the loads $L_i$, $L_{ESS}$ may be expressed as electric powers $P_i$, $P_{ESS}$.

The load $L_i$ of a battery unit i may also be determined taking one or more additional parameters into account. Purely by way of example, such additional parameter(s) may be related to each individual battery unit 24, 26 of the electric energy storage system 18 and/or to the electric interaction, preferably the electrical dynamic interaction, between the battery units 24, 26 of the electric energy storage system 18. As another non-limiting example, the electrical connection resistance between battery units may be considered.

Purely by way of example, the battery parameter set further comprises one, more or all of the following values for each battery unit 24, 26 in the electric energy storage system: a state-of-charge value $SoC_i$ indicative of the state-of-charge of the battery unit, a state-of-health value $SoH_i$ indicative of the state-of-health of the battery unit and an internal impedance value $Z_i$ indicative of the internal impedance of the battery unit.

Instead of, or in addition to, the above parameters, the method according to the first aspect of the present disclosure comprises predicting the imparted load on each battery unit 24, 26 in the electric energy storage system by employing a multi-battery model that takes into account the electric interaction, preferably the electrical dynamic interaction, between the battery units 24, 26 of the electric energy storage system 18. Purely by way of example, the electric energy storage system has a set of connective resistances $R_{ci-1,i}$ comprising a connective resistance between each adjacent pair of battery units in the electric energy storage system 18 and/or a connective resistance $R_{ci}$ between each battery unit and a reference point in the electric energy storage system 18.

Generally, a connective resistance between each adjacent pair of battery units in the electric energy storage system 18 may be related to a so called daisy-chain configuration of the battery units. Moreover, a connective resistance $R_{ci}$ between each battery unit and a reference point in the electric energy storage system 18 may generally be attributed to a so called star configuration of the battery units. The method according to the present disclosure is intended to cover each one or a combination of the daisy-chain and star configurations.

As a non-limiting example, the method further comprises also using the set of connective resistances $R_{ci-1,i}$ for determining an imparted load on each battery unit in the electric energy storage system.

The above alternatives are presented using example embodiments hereinbelow.

Single Battery Model

Figure 3:
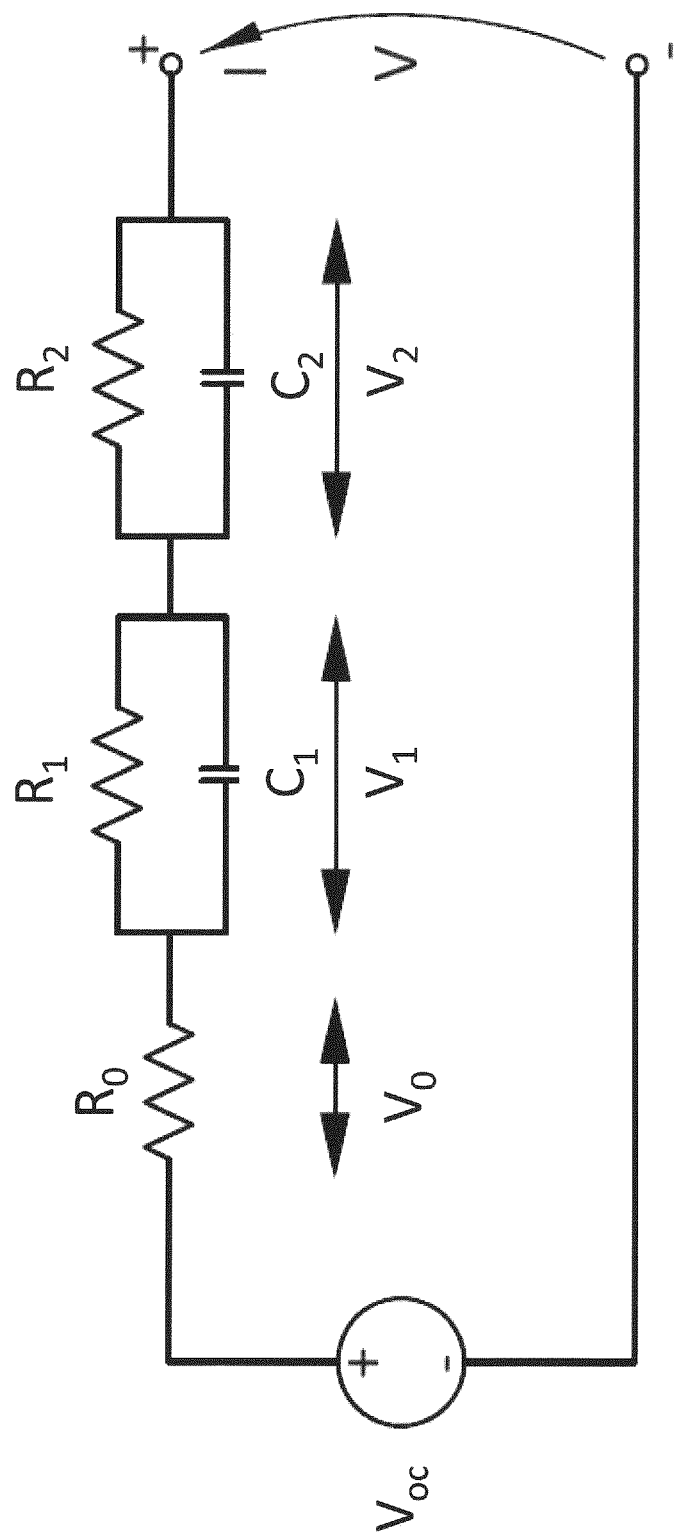

Each individual battery unit (i) may be modelled by equivalent circuit as shown in FIG. 3 may be regarded as having the following main elements:
- the previously mentioned internal ohmic resistance $R_{0i}$ that may be regarded as a nonlinear function of state-of-charge $SoC_i$ and temperature $T_i$, of the battery unit i,
- a fast dynamic activation polarization modelled by RC pair $R_{1i}$ and $C_{1i}$ which are nonlinear functions of state-of-charge $SoC_i$ and temperature $T_i$, and input load $L_i$, e.g. input current $I_i$, of the battery unit i,
- a slow dynamic concentration polarization modelled by RC pair $R_{2i}$ and $C_{2i}$ which are nonlinear functions of state-of-charge $SoC_i$ and temperature $T_i$, and input current $I_i$, of the battery unit i,
- the previously mentioned open circuit voltage $V_{oci}$ that may be regarded as a nonlinear function of state-of-charge $SoC_i$ and temperature $T_i$, of the battery unit i, The electro-thermal dynamics of any individual battery unit (i) within the electric energy storage system 18 can be represented on the following standard continuous-time state-space form:

$$\dot{V}_{1i}(t) = a_{1i}(t) \cdot V_{1i}(t) + b_{1i}(t) \cdot I_i(t)$$

$$\dot{V}_{2i}(t) = a_{2i}(t) \cdot V_{2i}(t) + b_{2i}(t) \cdot I_i(t)$$

$$\dot{SOC}_i(t) = b_{3i}(t) \cdot I_i(t)$$

$$V_i(t) = V_{oci}(t) + V_{1i}(t) + V_{2i}(t) + R_{0i}(t) \cdot I_i(t)$$

wherein $$a_{1i}(t) = \frac{1}{\tau_{1i}(t)}$$

where $\tau_{1i}(t) = R_{1i}(t) \cdot C_{i1}(t)$ is a fast varying time-constant $$a_{2i}(t) = \frac{1}{\tau_{2i}(t)}$$

where $\tau_{2i}(t) = R_{2i}(t) \cdot C_{2i}(t)$ is a slow varying time-constant $$b_{1i}(t) = \frac{1}{C_{1i}(t)},$$

$$b_{2i}(t) = \frac{1}{C_{2i}(t)},$$

$$b_{3i}(t) = \frac{\eta_i}{3600 \cdot Q_i(t)}$$

where $Q_i$ and $\eta_i$ are battery capacity and columbic efficiency, $V_{oci}(t) = f_{ocv}(SoC(t))$ gives open-circuit voltage as a function of battery SoC.

Note that $R_{0i}(t) = f_{R0i}(SoC_i(t), T_i(t))$, $R_{1i}(t) = f_{R1i}(SoC_i(t), T_i(t), I_i(t))$, $C_{1i}(t) = f_{C1i}(SoC_i(t), T_i(t), I_i(t))$, $R_{2i}(t) = f_{R2i}(SoC_i(t), T_i(t), I_i(t))$, and $C_{2i}(t) = f_{C2i}(SoC_i(t), T_i(t), I_i(t))$ are nonlinear functions of battery SoC, temperature, and input current. The battery temperature dynamics may be given by:

$$\dot{T}_i(t) = a_{ti} \cdot (T_{fi} - T_i(t)) + b_{ti} \cdot U_{heat,i}(t)$$

where $U_{heat,i}(t) = I_i \cdot (V_{oci} - V_i)$ is the total heat generation in the battery, $T_{fi}$ is the coolant temperature, and $a_{ti}$ and $b_{ti}$ are thermal constants that depend on heat capacity, thermal resistance, and heat transfer properties of coolant.

Multi Battery Model

Figure 4:
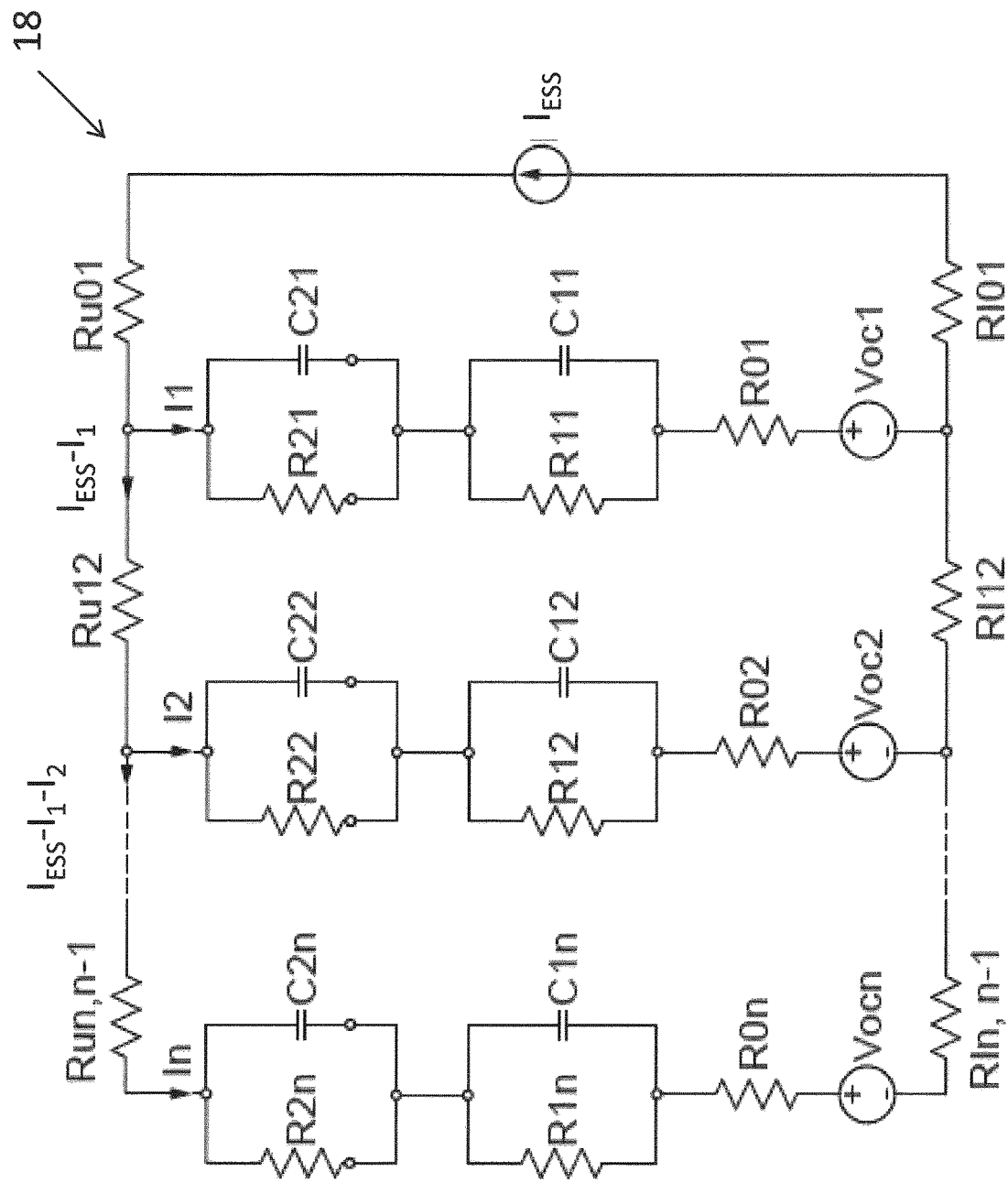

An example of a parallel configuration of battery modules is presented in FIG. 4. FIG. 4 illustrates that the electric energy storage system 18 disclosed therein comprises a set of connective resistances $R_{ci-1,i}$ comprising a connective resistance between each adjacent pair of battery units i−1,i in the electric energy storage system. Such a connection resistance may be formulated as:

$$R_{ci-1,i} = R_{ui-1,i} + R_{li-1,i}, \forall i \in \{1, \ldots, n\}$$

where $R_{ui-1,i}$ is the positive path connection resistance and $R_{li-1,i}$ is the negative path connection resistance between two adjacent battery units i−1 and i.

Following Kirchhoffs laws, constraints imposed by the parallel connections may be formulated as:

$$I_{ESS} = \sum_{i=1}^{n} I_i$$

$$V_i = V_{i-1} - \left(I_{ESS} - \sum_{j=1}^{i-1} I_j\right) \cdot R_{ci-1,i}$$

Now mainly using single battery model for each battery unit and exploiting parallel connection constraints among them as given above, a complete state-space model of a parallel multi-battery system 18 may be formulated in accordance with the following:

$$\dot{x}(t) = A_I(t) \cdot x(t) + B_I(t) \cdot u(t)$$

$$y(t) = C_I(t) \cdot x(t) + D_I(t) \cdot u(t) \quad \text{Eq. 12}$$

In Eq. 12, $x = [x_1 \ldots x_n]^T$ which is the full state vector of the complete electric energy storage system 18 wherein $x_i = [V_{1i}\ V_{2i}\ V_{oci}\ SoC_i\ T_i]^T$ is the state of each battery unit i. The output of the system is represented by $y = [I_1 \ldots I_n]^T$ where $I_i$ is the output current of each battery unit i. The control input of the state-space model is given by $u = [I_{ESS}\ U_{h,1} \ldots U_{h,1}]^T$ wherein $I_{ESS}$ is the total (e.g. total demanded) input current and $U_{h,I}$ is the total heat generated inside a battery unit i. It should be noted that $I_{ESS}$ may be regarded as an implementation of the total (e.g. total demanded) input load $L_{ESS}$.

The system matrix $A_I$, the input matrix $B_I$, the output matrix $C_I$ and the feedthrough matrix $D_I$ are nonlinear functions of system parameters ($R_{0i}$, $R_{1i}$, $R_{2i}$, $C_{1i}$, $C_{2i}$, $Q_i$, $R_{ci-1,i}$, $R_{ci}$) and system electro-thermal and ageing states ($SoC_i$, $T_i$, $SoQ_i$, $SoR_i$). Note that as compared to a single battery model, the open circuit voltage of each battery unit has been included as an additional state in order to derive a complete model for parallel multibattery systems.

As may be realized from Eq. 12 hereinabove, the state-space model is a vector-valued linear differential equation in the time domain (by virtue of the time derivative $\dot{x}$) and such a differential equation may be solved using a standard method, such as the backward Euler method.

In order to exemplify the above equations, the full matrices for n=2 are presented hereinbelow. The full state vector x for an electric energy storage system 18 with two battery units is given by:

$$x = \begin{bmatrix} x_1 \\ x_2 \end{bmatrix},$$

$$x_1 = \begin{bmatrix} V_{11} \\ V_{21} \\ Voc_1 \\ SoC_1 \\ T_1 \end{bmatrix},$$

$$x_2 = \begin{bmatrix} V_{12} \\ V_{22} \\ Voc_2 \\ SoC_2 \\ T_2 \end{bmatrix}$$

and the input vector u is given by:

$$u = \begin{bmatrix} I_{ESS} \\ U_{heat,1} \\ U_{heat,2} \end{bmatrix}$$

whereas the output vector y is given by:

$$y = \begin{bmatrix} I_1 \\ I_2 \end{bmatrix}$$

The system matrix $A_I$ comprises submatrices in accordance with the following:

$$A_I = \begin{bmatrix} A_{I,11} & A_{I,12} \\ A_{I,21} & A_{I,22} \end{bmatrix}$$

$$A_{I,11} = \frac{1}{\Omega} \cdot \begin{bmatrix} \frac{R_{01} + R_{02} + R_{11} + R_{c12}}{R_{11}C_{11}} & \frac{1}{C_{11}} & \frac{1}{C_{11}} & 0 & 0 \\ \frac{1}{C_{21}} & \frac{R_{01} + R_{02} + R_{11} + R_{c12}}{R_{21}C_{21}} & \frac{1}{C_{21}} & 0 & 0 \\ \frac{1}{C_{01}} & \frac{1}{C_{01}} & \frac{1}{C_{01}} & 0 & \Omega \cdot a_{t1} \frac{\partial V_{oc1}}{\partial T_1} \\ \frac{\eta_1}{3600Q_1} & \frac{\eta_1}{3600Q_1} & \frac{\eta_1}{3600Q_1} & 0 & 0 \\ 0 & 0 & 0 & 0 & \Omega \cdot a_{t1} \end{bmatrix}$$

$$A_{I,22} = \frac{1}{\Omega} \cdot \begin{bmatrix} \frac{R_{01}+R_{02}+R_{11}+R_{c12}}{R_{12}C_{12}} & \frac{1}{C_{12}} & \frac{1}{C_{12}} & 0 & 0 \\ \frac{1}{C_{22}} & \frac{R_{01}+R_{02}+R_{11}+R_{c12}}{R_{22}C_{22}} & \frac{1}{C_{22}} & 0 & 0 \\ \frac{1}{C_{02}} & \frac{1}{C_{02}} & \frac{1}{C_{02}} & 0 & \Omega \cdot a_{t2}\frac{\partial V_{oc2}}{\partial T_2} \\ \frac{\eta_2}{3600 Q_2} & \frac{\eta_2}{3600 Q_2} & \frac{\eta_2}{3600 Q_2} & 0 & 0 \\ 0 & 0 & 0 & 0 & \Omega \cdot a_{t2} \end{bmatrix}$$

$$A_{I,12} = -\frac{1}{\Omega} \cdot \begin{bmatrix} \frac{1}{C_{11}} & \frac{1}{C_{11}} & \frac{1}{C_{11}} & 0 & 0 \\ \frac{1}{C_{21}} & \frac{1}{C_{21}} & \frac{1}{C_{21}} & 0 & 0 \\ \frac{1}{C_{01}} & \frac{1}{C_{01}} & \frac{1}{C_{01}} & 0 & 0 \\ \frac{\eta_1}{3600 Q_1} & \frac{\eta_1}{3600 Q_1} & \frac{\eta_1}{3600 Q_1} & 0 & 0 \\ 0 & 0 & 0 & 0 & 0 \end{bmatrix}$$

$$A_{I,21} = -\frac{1}{\Omega} \cdot \begin{bmatrix} \frac{1}{C_{12}} & \frac{1}{C_{12}} & \frac{1}{C_{12}} & 0 & 0 \\ \frac{1}{C_{22}} & \frac{1}{C_{22}} & \frac{1}{C_{22}} & 0 & 0 \\ \frac{1}{C_{02}} & \frac{1}{C_{02}} & \frac{1}{C_{02}} & 0 & 0 \\ \frac{\eta_2}{3600 Q_2} & \frac{\eta_2}{3600 Q_2} & \frac{\eta_2}{3600 Q_2} & 0 & 0 \\ 0 & 0 & 0 & 0 & 0 \end{bmatrix}$$

$$\Omega = R_{01} + R_{02} + R_{c12} \quad \text{Eq. 13}$$

As such, $\Omega$ is a parameter of the accumulated resistance. Note that $$\frac{\partial V_{oc1}}{\partial T_1} \text{ and } \frac{\partial V_{oc2}}{\partial T_2}$$

are the jacobians of the open circuit voltage $V_{oci}$ of a battery unit with respect to the battery unit's temperature $T_i$. Such jacobians are treated as parameters in the model and may for instance be stored in look-up tables in a computer memory.

Again with reference to Eq. 12, the input matrix $B_I$ may be formulated as:

$$B_I = \begin{bmatrix} B_{I,1} \\ B_{I,2} \end{bmatrix}$$

$$B_1 = \frac{1}{\Omega} \begin{bmatrix} \frac{R_{02}+R_{c12}}{C_{11}} & 0 & 0 \\ \frac{R_{02}+R_{c12}}{C_{21}} & 0 & 0 \\ \frac{R_{02}+R_{c12}}{C_{01}} & \Omega\frac{\partial V_{oc1}}{\partial T_1} & 0 \\ \frac{\eta_1 \cdot (R_{02}+R_{c12})}{3600 Q_1} & 0 & 0 \\ 0 & \Omega \cdot b_{t1} & 0 \end{bmatrix},$$

$$B_{I,2} = \frac{1}{\Omega} \begin{bmatrix} \frac{R_{01}}{C_{12}} & 0 & 0 \\ \frac{R_{01}}{C_{22}} & 0 & 0 \\ \frac{R_{01}}{C_{02}} & 0 & \Omega\frac{\partial V_{oc2}}{\partial T_2} \\ \frac{\eta_2 \cdot R_{01}}{3600 Q_1} & 0 & 0 \\ 0 & 0 & \Omega \cdot b_{t2} \end{bmatrix}$$

The output matrix is given by:

$$C_I = \frac{1}{\Omega}\begin{bmatrix} -1 & -1 & -1 & 0 & 0 & 1 & 1 & 1 & 0 & 0 \\ 1 & 1 & 1 & 0 & 0 & -1 & -1 & -1 & 0 & 0 \end{bmatrix}$$

the direct feedthrough matrix D is given by:

$$D_I = \frac{1}{\Omega}\begin{bmatrix} R_{02}+R_{c12} & 0 & 0 \\ R_{01} & 0 & 0 \end{bmatrix}$$

As may be gleaned from the above, various system parameters, including battery impedances, capacities, cable connection resistances, temperatures etcetera enter into this model through the above matrices. This enables prediction of load, e.g. power or current, split between batteries with an appropriately high accuracy under given operating conditions.

It should also be noted that the above equations may be simplified by dropping all states related to internal polarizations and temperature from the above-mentioned model such that each element in the above-mentioned matrices $A_I$, $B_I$, $C_I$ and $D_I$ relating to internal polarizations and temperature is set to zero. Using such an approach for the matrices discussed hereinabove for the above example, viz a system with two battery units such that n=2, the following equations are obtained for the electric currents for each one of the battery units:

$$I_1 = \frac{R_{02} + R_{c12}}{\Omega} \cdot I_{ESS} + \frac{1}{\Omega} \cdot (V_{oc2} - V_{oc1})$$

$$I_2 = \frac{R_{01}}{\Omega} \cdot I_{ESS} + \frac{1}{\Omega} \cdot (V_{oc1} - V_{oc2})$$

$$\Omega = R_{01} + R_{02} + R_{c12}$$

As may be gleaned from the above, the load—here exemplified as the electric current—imparted on each one of the battery units may be determined using internal ohmic resistance values $R_{0i}$ and open circuit voltage value $V_{oci}$ for each battery unit as well as the connective resistances relating to the position of each battery in the electric energy storage system 18. In the above equations, the connective resistance $R_{c12}$ between the battery units—generally used for a daisy-chain configuration of battery units—has been employed. However, the above equations could easily be modified so as to also, or instead, include a connective resistance $R_{c1}$, $R_{c2}$ between each battery unit and a reference point in the electric energy storage system 18—which connective resistance generally is employed for a so called star configuration of battery units. For the sake of completeness, it should be noted that there may be a connective resistance $R_{c01}$ between the first battery unit and the load $L_{ESS}$ (exemplified as $I_{ESS}$ above) but such a connective resistance $R_{c01}$ may be omitted in the above equations. This is since the connective resistance $R_{c01}$ will form a common resistance in the path of each one of the battery units and may thus not have any influence of the load distribution among the battery units.

Moreover, the equation presented hereinabove using the internal ohmic resistance values $R_{0i}$, the open circuit voltage value $V_{oci}$ and the connective resistances could easily be expanded to any number n of battery units.

Furthermore, as has been intimated above, Eq. 12 represents a linear differential equation in the time domain (by virtue of the time derivative x) and such a differential equation may be solved using standard approaches, such as the backward Euler method. Such standard approaches may be used for any number of battery units in the electric energy storage system 18.

Irrespective of how the electric load $L_i$—exemplified by $I_i$ in the above presentation—imparted on each battery unit 24, 26 in an electric energy storage system 18 is predicted, e.g. using Eq. 10 and Eq. 11 or Eq. 12, the thus determined electric loads $L_i$ may be used for a plurality of purposes.

The second aspect of the present disclosure relates to one such use.

As such, the second aspect of the present disclosure relates to a method for evaluating the impact that an electric load level will have on an electric energy storage system 18 comprising at least two battery units 24, 26 electrically connected in parallel to each other.

The method comprises:

for each battery unit 24, 26 in the electric energy storage system 18, determining a state-of-power value $SOP_i$, $SOP_i(k)$, the state-of-power value being indicative of the maximum amount of electric load that the battery unit can deliver or receive at a constant load level during a predetermined future time range without violating electro-thermal limits of the battery unit, on the basis of the electric load level $L_{ESS}$, predicting the electric load $L_i$ imparted on each battery unit i in an electric energy storage system according to the method of the first aspect of the present disclosure, e.g. using Eq. 10 and Eq. 11 or Eq. 12 hereinabove, and for each battery unit i in the electric energy storage system, determining whether or not the battery load exceeds the state-of-power value $SOP_i$, $SOP_i(k)$.

As may be realized from the above, the method according to the second aspect of the present disclosure determines a state-of-power value $SOP_i$, $SOP_i(k)$ for each battery unit 24, 26 in the electric energy storage system 18. Such a determination may be performed in a plurality of different ways. As a non-limiting example, a supplier of battery unit may provide information indicative of the battery unit state-of-power value $SOP_i$. As another non-limiting example, the battery unit state-of-power value $SOP_i$ may be determined before adding the battery unit to an electric energy storage system 18, for instance using a test procedure or the like.

With reference to FIG. 2, the state-of-power value $SOP_i$ for each battery unit 24, 26 may be determined using individual battery management units (not shown in FIG. 2) as have been discussed above. Alternatively, the state-of-power value $SOP_i$ for each battery unit 24, 26 may be determined using a central system, such as the battery management system 28 in FIG. 2.

Purely by way of example, the battery unit state-of-power value $SOP_i$ may be set to be constant over a certain time period. As another non-limiting example, the battery unit state-of-power value $SOP_i$ may be set to be time dependent and may thus be denoted as $SOP_i(k)$ for instance.

As other non-limiting examples, the battery unit state-of-power value $SOP_i$ may be determined using a single battery model as will be discussed hereinbelow.

As a first example, the battery unit state-of-power value $SOP_i$ may simply be equated to the maximum current that can be imparted on the battery unit. As such, the battery unit state-of-power value $SOP_i$ may be expressed in accordance with the following:

$$SOP_i = I_i^{max} \qquad \text{Eq. 14}$$

It should be noted that the maximum current may be different depending on whether electric current is charged to or discharged from the battery unit. As such, a battery unit may be associated with two state-of-power values: a charge state-of-power value $SOP_{i,charge}$ and a discharge state-of-power value $SOP_{i,discharge}$, in accordance with the following:

$$SOP_{i,charge} = I_{i,charge}^{max}$$

$$SOP_{i,discharge} = I_{i,discharge}^{max} \qquad \text{Eq. 15}$$

As a non-limiting example, a single battery model may comprise the previously mentioned open circuit voltage $V_{oci}$, the previously mentioned internal resistance $R_{0i}$, a minimum voltage limit $V_i^{min}$ and a maximum voltage limit $V_i^{max}$. Purely by way of example, the above parameters may be static value or values that are assumed to be constant for a certain time range, such as the predetermined future time range discussed above. It should be noted that a single battery model also may comprise additional terms, e.g. one or more RC pairs as shown in FIG. 3 for modelling dynamic concentration and activation polarizations inside battery cells as has also been mentioned above.

As such, in a simplified form, the battery unit state-of-power value $SOP_i$, defined in terms of electric power, may be determined in accordance with the following:

$$SOP_i = I_i^{max} \cdot V_i^{min} = \frac{(V_i^{min} - V_{oci})}{R_{0i}} \cdot V_i^{min} \qquad \text{Eq. 16}$$

Here, it should be noted that the open circuit voltage $V_{oci}$ can be modelled so as to be dependent on the state of charge $SoC_i$ of the battery unit. Moreover, the state of charge $SoC_i$ may be a time dependent parameter. As such, Eq. 16 can be formulated in accordance with the following:

$$SOP_i(t) = I_i^{max}(t) \cdot V_i^{min} = \frac{(V_i^{min} - V_{oci}(SOC_i(t)))}{R_{0i}} \cdot V_i^{min} \qquad \text{Eq. 17}$$

It should be noted that the internal resistance $R_{0i}$ may also be dependent on whether electric current is charged to or discharged from the battery unit. As such, the battery unit may comprise a charging internal resistance $R_{0i,charge}$, as well as a discharging internal resistance $R_{0i,discharge}$. As such, in analogy with Eq. 15, battery unit may be associated with two state-of-power values in accordance with the following:

$$SOP_{i,charge}(t) = I_{i,charge}^{max}(t) \cdot V_i^{max} = \frac{(V_i^{max} - V_{oci}(SOC_i(t)))}{R_{0i,charge}} \cdot V_i^{max} \qquad \text{Eq. 18}$$

$$SOP_{i,discharge}(t) = I_{i,discharge}^{max}(t) \cdot V_i^{min} = \frac{(V_i^{min} - V_{oci}(SOC_i(t)))}{R_{0i,discharge}} \cdot V_i^{min}$$

For the sake of completeness, it should be noted that the maximum current for a battery unit, be it a charging or a discharging current, may be determined in a plurality of different ways. Purely by way of example, the maximum current may be determined in a test environment.

Optionally, as a general formulation, the maximum current may be determined using an optimization procedure taking e.g. the electro-thermal dynamics, the state of charge limits, and voltage limits of the battery unit into account.

Purely by way of example, using an example in which the state-of-power $SOP_i$ is defined in terms of electric current, the state-of-power may be determined by solving the maximization problem in Eq. 19 hereinbelow using the boundary conditions (i.e., electro-thermal constraints) as presented in Eq. 20 to Eq. 27 for a predetermined future time range $\Delta t$.

$$I_i^{max} = \max |I_i| \forall t \in [t_0, t_0 + \Delta t] \qquad \text{Eq. 19}$$

subject to:

Electrical dynamics: $\dot{x}_e(t) = f_e(x_e, x_t, I_i)$ \qquad Eq. 20

Thermal dynamics: $\dot{x}_T(t) = f_T(x_t, x_e, I_i)$ \qquad Eq. 21

Battery Voltage Output: $V_i(t) = f_1(x_e, x_t, I_i)$ \qquad Eq. 22

Battery Temperature: $T_i(t) = f_2(x_t, x_e, I_i)$ \qquad Eq. 23

State-Of-Charge Limits: $SoC_i^{min} \leq SoC_i(t+\Delta t) \leq SoC_i^{max}$ \qquad Eq. 24

Voltage Limits: $V_i^{min} \leq V_i(t+\Delta t) \leq V_i^{max}$ \qquad Eq. 25

Temperature Limits: $T_i^{min} \leq T_i(t+\Delta t) \leq T_i^{max}$ \qquad Eq. 26

Current Limits: $I_{i,minAbs} \leq I_i(t:t+\Delta t) \leq I_{i,maxAbs}$ \qquad Eq. 27

Here, it should be noted that the current limits, i.e. $I_{i,minAbs}$ and $I_{i,maxAbs}$, respectively may relate to absolute maximum current safety limits according to e.g. manufacturer datasheet which should not be exceeded in order to ensure that hazardous events are avoided. Irrespective of how the state-of-power value $SOP_i$, $SOP_i(k)$ is determined for each battery unit 24, 26 in the electric energy storage system 18, the method according to the second aspect of the present disclosure determines whether or not the battery load $L_i$ exceeds the state-of-power value $SOP_i$, $SOP_i(k)$ for each battery unit 24, 26.

Purely by way of example, in order to perform the above determination, the battery load $L_i$ and the state-of-power value $SOP_i$, $SOP_i(k)$ are preferably expressed as the same entity, e.g. in terms of electric power or electric current. Using the electric current as an example, the predicted battery current may be expressed as $I_i$ and the state-of-power value may be expressed as $I_i^{max}$ and the above-mentioned determination—viz whether or not the battery load $L_i$ exceeds the state-of-power value $SOP_i$, $SOP_i(k)$ for each battery unit 24, 26—may be expressed a determining whether or not the below condition is met for the battery unit:

$$|I_i| \leq |I_i^{max}| \qquad \text{Eq. 28}$$

As has been intimated in Eq. 15 hereinabove, a battery unit may be associated with two state-of-power values: a charge state-of-power value $SOP_{i,charge}$ and a discharge state-of-power value $SOP_{i,discharge}$. As such, the above procedure of the second aspect of the present disclosure of determining whether or not the battery load $L_i$ exceeds the state-of-power value $SOP_i$, $SOP_i(k)$ for each battery unit 24, 26, may be expressed in accordance with the following:

$$I_i \leq I_{i,charge}^{max} \text{ OR}$$

$$I_i \geq I_{i,discharge}^{max} \qquad \text{Eq. 29}$$

The above differences in the above expressions emanates from the fact that the discharging current is considered as negative as a convention here.

The method according to the second aspect of the present disclosure may for instance be used in a method according to a third aspect of the present disclosure. An embodiment of the method according to the third aspect of the present disclosure is presented hereinbelow with reference to FIG. 5.

Figure 5:
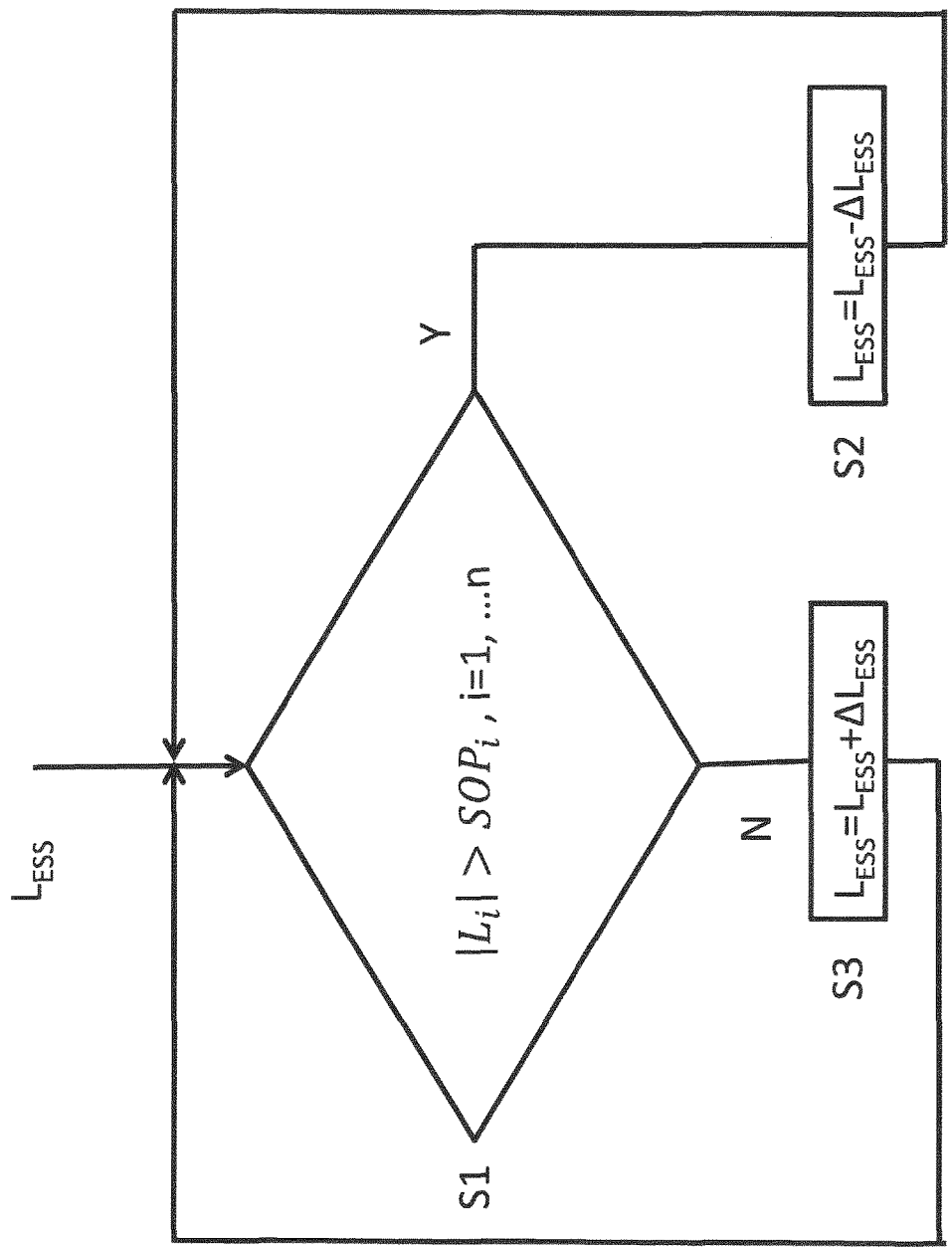
FIG. 5 illustrates a flowchart for an embodiment of a method according to a third aspect of the present disclosure.

FIG. 5 illustrates a method for determining an electric load $L_{ESS}$ to be imparted on an electric energy storage system 18 comprising at least two battery units 24, 26 electrically connected in parallel to each other.

The method may for instance use a starting value for the electric load $L_{ESS}$. As a non-limiting example, such a starting value may be set to zero. As another alternative, the starting value $L'_{ESS}$ for the electric load $L_{ESS}$ may be selected using e.g. an heuristic approach. Purely by way of example, a starting value $L'_{ESS}$ may be set as the sum of the state-of-power value $SOP_i$, $SOP_i(k)$ for each battery unit 24, 26 in the electric energy storage system 18. Irrespective of how the starting value is selected, the method comprises employing a correction process comprising the following correction steps:

S1 Evaluating the impact that an electric load level $L_{ESS}$ will have on the electric energy storage system 18 using the method according to the second aspect of the present disclosure. As such, the method according to the third aspect of the present disclosure obtains information whether or not the battery load $L_i$—which is the predicted battery load $L_i$ for the electric load level $L_{ESS}$—exceeds the state-of-power value $SOP_i$, $SOP_i(k)$ for each battery unit 24, 26.

S2 In response to the determination that the battery load exceeds the state-of-power value $SOP_i$, $SOP_i(k)$ for at least one of the battery units 24, 26, reducing the electric load level $L_{ESS}$. Purely by way of example, and as indicated in FIG. 5, the electric load level $L_{ESS}$ may be reduced by a predetermined value $\Delta L_{ESS}$. As a non-limiting example, the predetermined value $\Delta L_{ESS}$ may for example be determined based on the level of violation or offset between $L_i$ and $SOP_i$.

S3 In response to the determination that the battery load is lower than the state-of-power value $SOP_i$, $SOP_i(k)$ for each one of the battery units, increasing the electric load level, Purely by way of example, and as indicated in FIG. 5, the electric load level $L_{ESS}$ may be reduced by a predetermined value $\Delta L_{ESS}$.

As may be realized from the above, the method as illustrated in FIG. 5 corrects the electric load $L_{ESS}$ in dependence on whether or not any state-of-power value $SOP_i$, $SOP_i(k)$ is exceeded. The correction procedure in FIG. 5 may be performed a plurality of times. Purely by way of example, the correction process according to the third aspect of the present disclosure and exemplified in FIG. 5 may be an iterative process that repeats the correction steps above until a stopping criterion has been reached.

Figure 6:
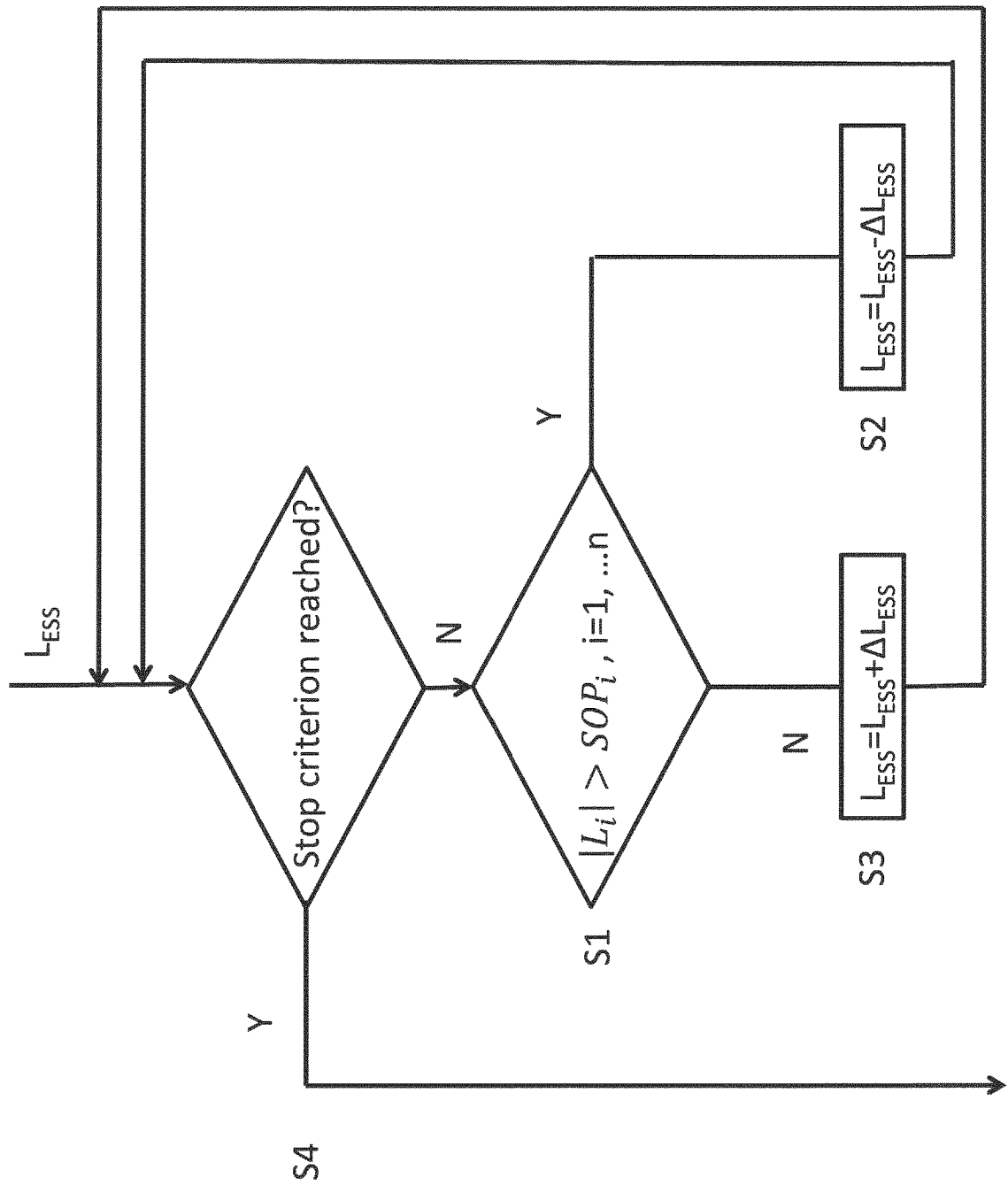
FIG. 6 illustrates a flowchart for another embodiment of a method according to a third aspect of the present disclosure.

To this end, reference is made to FIG. 6, illustrating an embodiment of the method according to the third aspect of the present disclosure which comprises a step S4 that evaluates whether or not a stopping criterion has been reached. In the event that the stopping criterion has been reached, the correction process as outlined hereinabove with reference to steps S1-S3, see also FIG. 6, is terminated.

The stopping criterion may be formulated in a plurality of different ways. As a non-limiting example, the stopping criterion may comprise that a smallest battery offset value, being the difference between the battery load and the state-of-power value for a battery unit, among the battery units 24 26, is within a predetermined threshold range, preferably the predetermined threshold range is zero. In the event that the range actually zero, the stopping criterion may be formulated as that the battery load $L_i$ equals the state-of-power value $SOP_i$, $SOP_i(k)$ for at least one battery unit, e.g.

$$|I_i|=|I_i^{max}| \qquad \text{Eq. 30}$$

The predetermined threshold range as discussed hereinabove may be regarded as a tolerance for the equality expressed in Eq. 30 such that the stopping criterion need not require that a battery load $L_i$ must equal the state-of-power value $SOP_i$, $SOP_i(k)$. As a non-limiting example, the abovementioned predetermined threshold range may be expressed as a fraction of the state-of-power value $SOP_i$, $SOP_i(k)$ for the battery unit concerned. Consequently, the stopping criterion may be formulated as $|L_i-SOP_i| \leq \gamma \cdot |SOP_i|$. Purely by way of example, $\gamma$ may be selected to be in the range of 0.001-0.05, preferably within the range of 0.001-0.01.

Although the above presented iterative procedure is appropriate in many applications in order to determine an electric load $L_{ESS}$ to be imparted on an electric energy storage system 18, such an electric load $L_{ESS}$ may be determined using other procedures as well.

To this end, a fourth aspect of the present disclosure relates to a method for determining an electric load $L_{ESS}$ to be imparted on an electric energy storage system 18 comprising at least two battery units 24, 26 electrically connected in parallel to each other. The method according to the fourth aspect of the present disclosure employs the method for evaluating the impact that an electric load level $L_{ESS}$ will have on an electric energy storage system according to the second aspect of the present disclosure and comprises determining the largest electric load $L_{ESS}$ that can be imparted on an electric energy storage system 18 without the battery load exceeding the state-of-power value $SOP_i$, $SOP_i(k)$ for any battery unit in the electric energy storage system.

Using the current $I_{ESS}$ as an example of electric load level $L_{ESS}$, the fourth aspect of the present disclosure may be formulated in accordance with the following:

$$\max |I_{ESS}|, \forall t \in [t_0, t_0+\Delta t] \qquad \text{Eq. 31}$$

subject to:

$$\dot{x}(t)=A_I(t) \cdot x(t) + B_I(t) \cdot u_{ESS} \qquad \text{Eq. 32}$$

$$y(t)=C_I(t) \cdot x(t) + D_I(t) \cdot u_{ESS} \qquad \text{Eq. 33}$$

$$u_{ESS}=[I_{ESS}\ U_{heat,1}\ \ldots\ U_{heat,n}]^T \qquad \text{Eq. 34}$$

$$y=[I_1\ \ldots\ I_n]^T \qquad \text{Eq. 35}$$

$$|I_i| \leq |I_i^{max}|, \forall i \qquad \text{Eq. 36}$$

The constraints for the optimization problem above, which constraints are presented in Eq. 32 to Eq. 36 have already been discussed in relation to Eq. 12 and are thus not repeated here. Purely by way of example, the above optimization problem may be solved using conventional techniques, such as Linear Programming, Karmakar's algorithm, and/or general nonlinear programming techniques for instance.

Needless to say, the optimization problem in Eq. 31 may be adapted to a charging condition or a discharging condition. Again using the current $I_{ESS}$ as an example of electric load level $L_{ESS}$ and assessing a charging condition, the fourth aspect of the present disclosure may be formulated in accordance with the following:

$$\max |I_{ESS,charge}|, \forall t \in [t_0, t_0+\Delta t] \qquad \text{Eq. 37}$$

subject to:

$$\dot{x}(t)=A_I(t) \cdot x(t) + B_I(t) \cdot u_{ESS,charge} \qquad \text{Eq. 38}$$

$$y(t)=C_I(t) \cdot x(t) + D_I(t) \cdot u_{ESS,charge} \qquad \text{Eq. 39}$$

$$u_{ESS,charge}=[I_{ESS,charge}\ U_{heat,1}\ \ldots\ U_{heat,n}]^T \qquad \text{Eq. 40}$$

$$y=[I_1\ \ldots\ I_n]^T \qquad \text{Eq. 41}$$

$$I_i \leq I_{i,charge}^{max}, \forall i \qquad \text{Eq. 42}$$

For a discharging condition, the fourth aspect of the present disclosure may be formulated in accordance with the following:

$$\max |I_{ESS,discharge}|, \forall t \in [t_0, t_0+\Delta t] \qquad \text{Eq. 43}$$

subject to:

$$\dot{x}(t)=A_I(t) \cdot x(t) + B_I(t) \cdot u_{ESS,discharge} \qquad \text{Eq. 44}$$

$$y(t)=C_I(t) \cdot x(t) + D_I(t) \cdot u_{ESS,discharge} \qquad \text{Eq. 45}$$

$$u_{ESS,discharge}=[I_{ESS,discharge}\ U_{heat,1}\ \ldots\ U_{heat,n}]^T \qquad \text{Eq. 46}$$

$$y=[I_1\ \ldots\ I_n]^T \qquad \text{Eq. 47}$$

$$I_i \geq I_{i,discharge}^{max}, \forall i \qquad \text{Eq. 48}$$

Each one of the method embodiments presented hereinabove comprises predicting an imparted load on each battery unit 24, 26 in an electric energy storage system 18.

However, it is also possible to determine an electric load $L_{ESS}$ to be imparted on an electric energy storage system 18 without explicitly determining the imparted load on each battery unit 24, 26. To this end, a fifth aspect of the present disclosure relates to a method for determining an electric load $L_{ESS}$ to be imparted on an electric energy storage system 18 comprising at least two battery units 24, 26 electrically connected in parallel to each other.

The method according to the fifth aspect of the present disclosure is presented hereinbelow.

Establishing a battery parameter set, the battery parameter set comprising at least the following values for each battery unit in the electric energy storage system: an internal ohmic resistance value $R_{0i}$ indicative of the internal ohmic resistance of the battery unit and an open circuit voltage value $V_{oci}$ indicative of the open circuit voltage of the battery unit. The above procedure has been presented hereinabove with reference to the first aspect of the present disclosure and is thus not repeated here.

For each battery unit in the electric energy storage system, determining a state-of-power value $SOP_i$, $SOP_i(k)$, the state-of-power value being indicative of the maximum amount of electric load that the battery unit can deliver or receive at a constant load level during a predetermined future time range without violating electro-thermal limits of said battery unit. The determination of the state-of-power value $SOP_i$, $SOP_i(k)$ has also been presented hereinabove and is thus not repeated here.

For each battery unit 24, 26 in the electric energy storage system 18, determining a battery unit measure $BUM_i$ being proportional to the magnitude of a sum of elements, a first element being the product of the internal ohmic resistance value and the state-of-power value $SOP_i$, $SOP_i(k)$ and a second element being the open circuit voltage value. As such, the battery unit measure $BUM_i$ may be determined in accordance with the following:

$$BUM_i \sim (R_{0i} \cdot SOP_i + V_{oci}) \quad \text{Eq. 49}$$

Using the current I as an example of the state-of-power value $SOP_i$, $SOP_i(k)$ for a charging condition, Eq. 49 may be formulated in accordance with the following:

$$BUM_i \sim (R_{0i} \cdot I_{i,charging}^{max} + V_{oci}) \quad \text{Eq. 50}$$

Moreover, the method according to the fifth aspect of the present disclosure further comprises: among the battery units i in the electric energy storage system 18, determining the smallest magnitude of the battery unit measure $BUM_{min}$ in order to arrive at an electric load measure indicative of the electric load to be imparted on an electric energy storage system.

$$BUM_{min} = \min_{i \in 1,\ldots,n} |BUM_i| \quad \text{Eq. 51}$$

Purely by way of example, the smallest magnitude of the battery unit measure $BUM_{min}$ may be used directly in a procedure for determining an electric load $L_{ESS}$ to be imparted on an electric energy storage system 18 comprising at least two battery units 24, 26. Purely by way of example, embodiments of the fifth aspect of the present disclosure may use the above procedure for identifying the battery unit i being associated with the smallest magnitude of the battery unit measure $BUM_{min}$ and on the basis thereof determine the electric load $L_{ESS}$.

However, the method according to the fifth aspect of the present disclosure may further comprise multiplying the smallest unit magnitude measure by the sum of the inverse of the internal ohmic resistance value $R_{0i}$ for each battery unit i in the electric energy storage system 18. Moreover, the method according to the fifth aspect of the present disclosure may further comprise subtracting the ratio between the open circuit voltage $V_{oci}$ and the internal ohmic resistance $R_{0i}$ for each battery unit i in the electric energy storage system 18 from the electric load measure $BUM_i$.

Embodiments of the method of the fifth aspect of the present disclosure, may comprise only one of the above modifications—viz multiplying the smallest unit magnitude measure by the sum of the inverse of the internal ohmic resistance value $R_{0i}$ for each battery unit i as well as subtracting the ratio between the open circuit voltage $V_{oci}$ and the internal ohmic resistance $R_{0i}$ for each battery unit i—to the electric load measure $BUM_i$.

However, presented hereinbelow are equations representing example embodiments in which both modifications have been performed. In the below example, the current I is used as an example of the state-of-power value $SOP_i$, $SOP_i(k)$ for a charging condition and a discharging condition, respectively.

$$I_{ESS,charge}^{max} = \left(\sum_{i=1}^{n} \frac{1}{R_{oi}}\right) \cdot \min_{i \in 1,\ldots,n}$$

$$\{(R_{01} \cdot I_{1,charge}^{max} + V_{oc1}), \ldots, (R_{0n} \cdot I_{n,charge}^{max} + V_{ocn})\} - \sum_{i=1}^{n} \frac{V_{oci}}{R_{oi}}$$

$$I_{ESS,discharge}^{max} = \left(\sum_{i=1}^{n} \frac{1}{R_{oi}}\right) \cdot \max_{i \in 1,\ldots,n}$$

$$\{(R_{01} \cdot I_{1,discharge}^{max} + V_{oc1}), \ldots, (R_{0n} \cdot I_{n,discharge}^{max} + V_{ocn})\} - \sum_{i=1}^{n} \frac{V_{oci}}{R_{oi}}$$

The above equations for $I_{ESS,charge}^{max}$ and $I_{ESS,discharge}^{max}$ are derived as a solution to a constrained Linear Programming problem (similar to full-order optimization problems shown in to 45, but using zero-order multi-battery model instead of full-order model used there).

It should be also be noted that embodiments of the present disclosure may comprise the following:

For each one of a plurality of time instants k, determining an electric load $L_{ESS}(k)$ to be imparted on an electric energy storage system 18 using the method according to any one of the third to fifth aspects of the present disclosure. Purely by way of example, the electric load $L_{ESS}(k)$ to be imparted on an electric energy storage system 18 for each time instant k may be determined using any one of the electric load determination method embodiments presented hereinabove.

Determining the electric load $L_{ESS}$ by applying a filter, preferably a low pass filter and/or a weighted moving average filter, to the electric loads $L_{ESS}(k)$ for the plurality of time instants k.

Irrespective of how the electric load $L_{ESS}$, e.g. irrespective of which of the third to fifth aspects of the present disclosure that has been used for determining the electric load $L_{ESS}$, a sixth aspect of the present disclosure relates to a method for controlling the loading of an electric energy storage system 18 comprising at least two battery units 24.26 electrically connected in parallel to each other. The method comprises determining the electric load to be imparted on an electric energy storage system using the method according to any one of the third to fifth aspects of the present disclosure, and imparting the thus determined electric load $L_{ESS}$ on the energy storage system 18, e.g. by charging or discharging the energy storage system 18.

Moreover, for any aspect of the present disclosure, in particular as regards the embodiments presented hereinabove, the state-of-power value $SOP_i$, $SOP_i(k)$ may be indicative of the maximum amount of electric current I, alternatively electric power P, that the battery unit i can deliver or receive at a constant load level during the predetermined future time range without violating electro-thermal limits of said battery unit i.

In a similar vein, for any aspect of the present disclosure, in particular as regards the embodiments presented hereinabove, the electric load $L_{ESS}$ may be indicative of electric current $I_{ESS}$, alternatively electric power $P_{ESS}$.

It is to be noted that the present disclosure is not limited to the embodiments described hereinabove and illustrated in the drawings; rather the skilled person will recognize that many changes and modifications may be made within the scope of the appended claims. For example, although the present disclosure has mainly been described in relation to a bus, the disclosure should be equally applicable to any type of vehicle, such as any type of electrical vehicle. In fact, the present disclosure may be used for any type of energy storage system.

The invention claimed is:

1. A method for predicting an electric load imparted on each battery unit in an electric energy storage system comprising at least two battery units electrically connected in parallel to each other, the method comprising:
    establishing a battery parameter set, said battery parameter set comprising at least the following values for each battery unit in said electric energy storage system:
        an internal ohmic resistance value indicative of the internal ohmic resistance of said battery unit and an open circuit voltage value indicative of the open circuit voltage of said battery unit,
    using an electric load level indicative of a total electric energy storage system load, and
    using said electric load level and said battery parameter set for predicting said imparted load on each battery unit in said electric energy storage system,
    wherein said imparted load comprises two addends: a first addend indicative of differences in said internal ohmic resistance values amongst said battery units of said electric energy storage system and a second addend indicative of differences in said open circuit voltage values amongst said battery units of said electric energy storage system,
    wherein said first addend for a certain battery unit of said electric energy storage system comprises a first addend factor multiplied by said electric load level, said first addend factor comprising a numerator and a denominator in accordance with the following:
    for said certain battery unit, said numerator comprising the product of the internal ohmic resistance values of every battery unit in said electric energy storage system except for said certain battery unit, and
    said denominator comprises the sum of a set of products, the number of the products corresponding to the number of battery units in said electric energy storage system and each product being assigned to an individual battery unit of said electric energy storage system, wherein a product for a certain battery unit is obtained by multiplying internal ohmic resistance values of all battery units in said electric energy storage system except for said individual battery unit.

2. The method according to claim 1, comprising predicting said imparted load on each battery unit in said electric energy storage system by employing a multi-battery model that takes into account the electric interaction, preferably the electrical dynamic interaction, between the battery units of said electric energy storage system.

3. The method according to claim 1, wherein said second addend for a certain battery unit is proportional to the sum of a set of summands, the number of the summands corresponding to the number of battery units minus one, and each summand is associated to a specific battery unit being different from said certain battery unit and the summand being calculated in accordance with the following:
    for each battery unit in said electric energy storage system which is not said certain battery unit: calculating the difference in said open circuit voltage values between the battery unit and said certain battery unit and multiplying that difference by the product of the internal ohmic resistance value of each one of said battery units in said electric energy storage system, except for said certain battery unit and said specific battery unit and adding that value to said summand.

4. The method according to claim 3, wherein each one of said summand is divided by a denominator, said denominator comprising the sum of a set of products, the number of the products corresponding to the number of battery units in said electric energy storage system and each product being assigned to an individual battery unit of said electric energy storage system, wherein a product for a certain battery unit is obtained by multiplying internal ohmic resistance values of all battery units in said electric energy storage system except for said individual battery unit.

5. The method according to claim 1, wherein said battery parameter set further comprises one, more or all of the following values for each battery unit in said electric energy storage system: a state-of-charge value indicative of the state-of-charge of said battery unit, a state-of-health value indicative of the state-of-health of said battery unit and an internal impedance value indicative of the internal impedance of said battery unit.

6. The method according to claim 1, wherein said electric energy storage system has a set of connective resistances comprising a connective resistance between each adjacent pair of battery units and/or a connective resistance between each battery unit and a reference point in said electric energy storage system, said method further comprising also using said set of connective resistances for determining an imparted load on each battery unit in said electric energy storage system.

7. A method for evaluating the impact that an electric load level will have on an electric energy storage system comprising at least two battery units electrically connected in parallel to each other, the method comprising:
    for each battery unit in said electric energy storage system, determining a state-of-power value, said state-of-power value being indicative of the maximum amount of electric load that the battery unit can deliver or receive at a constant load level during a predetermined future time range without violating electro-thermal limits of said battery unit,
    on the basis of said electric load level, predicting the electric load imparted on each battery unit in an electric energy storage system according to claim 1, for each battery unit in said electric energy storage system, determining whether or not said battery load exceeds said state-of-power value.

8. A method for determining an electric load to be imparted on an electric energy storage system comprising at least two battery units electrically connected in parallel to each other, the method comprising employing a correction process comprising the following correction steps:
evaluating the impact that an electric load level will have on said electric energy storage system using the method according to claim 7,
in response to the determination that said battery load exceeds said state-of-power value for at least one of said battery units, reducing said electric load level, and
in response to the determination that said battery load is lower than said state-of-power value for each one of said battery units, increasing said electric load level, said method further comprising setting the electric load level being the result from said correction process as said electric load.

9. The method according to claim 8, wherein said correction process is an iterative process that repeats correction steps until a stopping criterion has been reached.

10. The method according to claim 9, wherein said stopping criterion comprises that a smallest battery offset value, being the difference between said battery load and said state-of-power value for a battery unit, among said battery units, is within a predetermined threshold range, preferably said predetermined threshold range is zero.

11. A method for determining an electric load to be imparted on an electric energy storage system comprising at least two battery units electrically connected in parallel to each other, the method employing the method for evaluating the impact that an electric load level will have on an electric energy storage system according to claim 7 and comprising determining the largest electric load that can be imparted on an electric energy storage system without said battery load exceeding said state-of-power value for any battery unit in said electric energy storage system.

12. The method according to claim 8, wherein said method comprises:
for each one of a plurality of time instants, determining an electric load to be imparted on an electric energy storage system, and
determining said electric load by applying a filter, preferably a low pass filter and/or a weighted moving average filter, to said electric loads for said plurality of time instants.

13. A method for controlling the loading of an electric energy storage system comprising at least two battery units electrically connected in parallel to each other, the method comprising determining the electric load to be imparted on an electric energy storage system using the method according to claim 8, and imparting the thus determined electric load on said energy storage system.

14. The method according to claim 7, wherein said state-of-power value is indicative of the maximum amount of electric current, alternatively electric power, that the battery unit can deliver or receive at a constant load level during said predetermined future time range without violating electro-thermal limits of said battery unit.

15. The method according to claim 1, wherein said electric load is indicative of electric current, alternatively electric power.

16. A non-transitory computer readable medium carrying a computer program comprising program code for performing the steps of claim 1 when said program code is run on a computer.

17. A battery management system for an electric energy storage system comprising at least two battery units electrically connected in parallel to each other, the battery management system being adapted to predict an electric load imparted on each battery unit in said electric energy storage system by:
establishing a battery parameter set, said battery parameter set comprising at least the following values for each battery unit in said electric energy storage system: an internal ohmic resistance value indicative of the internal ohmic resistance of said battery unit and an open circuit voltage value indicative of the open circuit voltage of said battery unit,
using an electric load level indicative of a total electric energy storage system load,
using said electric load level and said battery parameter set for predicting said imparted load on each battery unit in said electric energy storage system.

18. A method for determining an electric load to be imparted on an electric energy storage system comprising at least two battery units electrically connected in parallel to each other, the method comprising employing a correction process comprising the following correction steps:
evaluating the impact that an electric load level will have on said electric energy storage system using a method for evaluating the impact that the electric load level will have on the electric energy storage system, the method comprising:
for each battery unit in said electric energy storage system, determining a state-of-power value, said state-of-power value being indicative of the maximum amount of electric load that the battery unit can deliver or receive at a constant load level during a predetermined future time range without violating electro-thermal limits of said battery unit,
on the basis of said electric load level, predicting the electric load imparted on each battery unit in said electric energy storage system using a method for predicting an electric load imparted on each battery unit in the electric energy storage system, the method for predicting the electric load imparted on each battery unit in the electric energy storage system comprising:
establishing a battery parameter set, said battery parameter set comprising at least the following values for each battery unit in said electric energy storage system: an internal ohmic resistance value indicative of the internal ohmic resistance of said battery unit and an open circuit voltage value indicative of the open circuit voltage of said battery unit, and
using said electric load level and said battery parameter set for predicting said imparted load on each battery unit in said electric energy storage system,
for each battery unit in said electric energy storage system, determining whether or not said battery load exceeds said state-of-power value,
in response to the determination that said battery load exceeds said state-of-power value for at least one of said battery units, reducing said electric load level, and in response to the determination that said battery load is lower than said state-of-power value for each one of said battery units, increasing said electric load level, said method further comprising setting the electric load level being the result from said correction process as said electric load, wherein said correction process is an iterative process that repeats correction steps until a stopping criterion has been reached, wherein said stopping criterion comprises that a smallest battery offset value, being the difference between said battery load and said state-of-power value for a battery unit, among said battery units, is within a predetermined threshold range.

19. A method for determining an electric load to be imparted on an electric energy storage system comprising at least two battery units electrically connected in parallel to each other, the method comprising employing a correction process comprising the following correction steps for each one of a plurality of time instants:

evaluating the impact that an electric load level will have on said electric energy storage system using a method for evaluating the impact that the electric load level will have on the electric energy storage system, the method comprising:

for each battery unit in said electric energy storage system, determining a state-of-power value, said state-of-power value being indicative of the maximum amount of electric load that the battery unit can deliver or receive at a constant load level during a predetermined future time range without violating electro-thermal limits of said battery unit, on the basis of said electric load level, predicting the electric load imparted on each battery unit in said electric energy storage system using a method for predicting an electric load imparted on each battery unit in the electric energy storage system, the method for predicting the electric load imparted on each battery unit in the electric energy storage system comprising:

establishing a battery parameter set, said battery parameter set comprising at least the following values for each battery unit in said electric energy storage system: an internal ohmic resistance value indicative of the internal ohmic resistance of said battery unit and an open circuit voltage value indicative of the open circuit voltage of said battery unit, and using said electric load level and said battery parameter set for predicting said imparted load on each battery unit in said electric energy storage system, for each battery unit in said electric energy storage system, determining whether or not said battery load exceeds said state-of-power value, in response to the determination that said battery load exceeds said state-of-power value for at least one of said battery units, reducing said electric load level, and in response to the determination that said battery load is lower than said state-of-power value for each one of said battery units, increasing said electric load level, said method further comprising setting the electric load level being the result from said correction process as said electric load, the method further comprises determining said electric load by applying a filter, preferably a low pass filter and/or a weighted moving average filter, to said electric loads for said plurality of time instants.

* * * * *